United States Patent Office 3,220,052
Patented Nov. 30, 1965

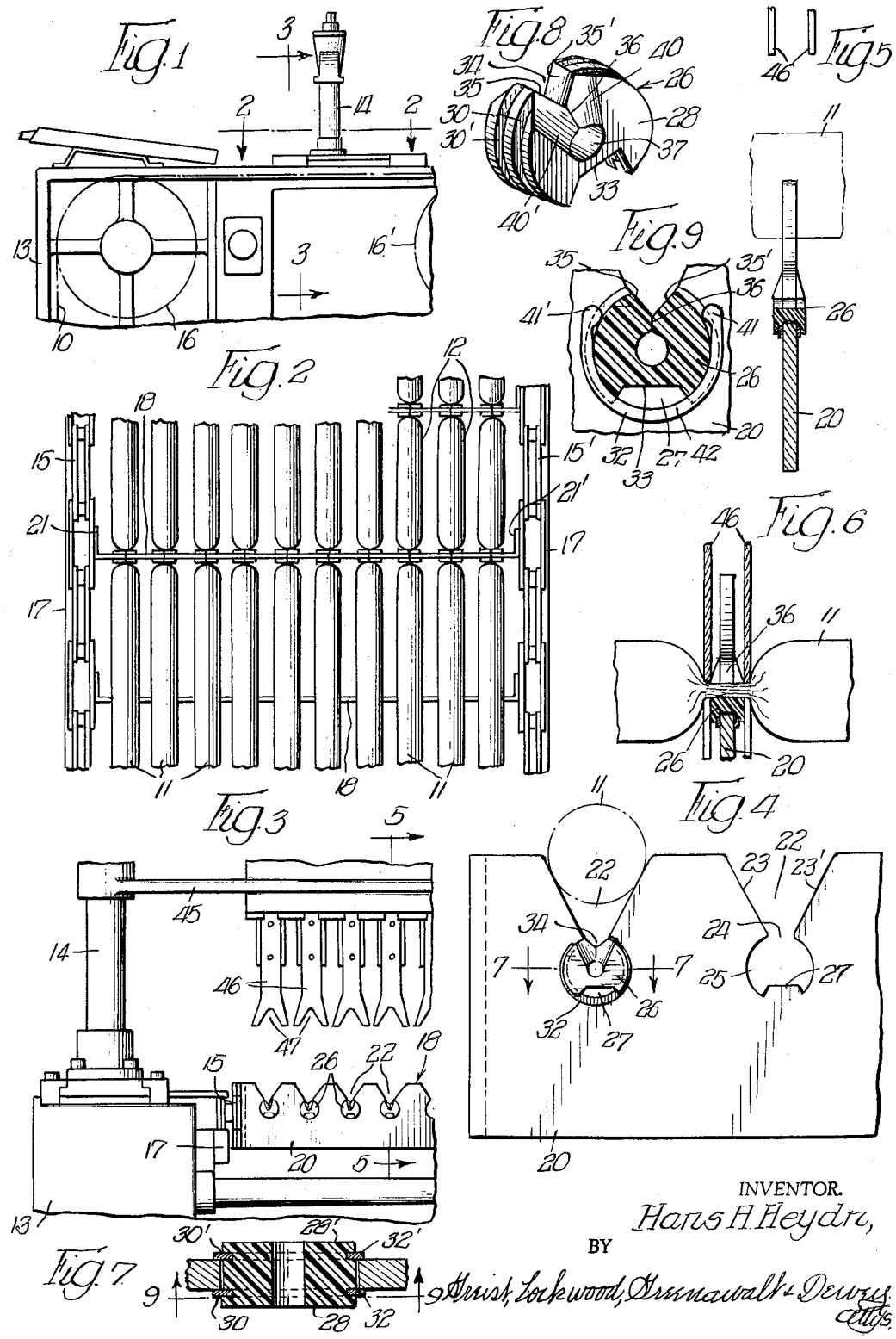

3,220,052
SAUSAGE LINKING APPARATUS
Hans H. Heydn, Madison, Wis., assignor to Oscar Mayer & Co., Inc., Chicago, Ill., a corporation of Illinois
Filed Mar. 11, 1964, Ser. No. 351,075
5 Claims. (Cl. 17—34)

This invention relates to the manufacture of sausages and is more particularly concerned with apparatus for dividing relatively long lengths of filled or stuffed sausage casings into links by constricting the casings at intervals corresponding to the desired length of sausages and thereafter retaining the same in connected link forming relation while the links are carried through processing chambers where they are cooked and smoked, after which they are removed from the apparatus and separated from the casings.

It is a general object of the invention to provide an improved apparatus for dividing stuffed sausage casings into link forming lengths which may be readily incorporated in a sausage linking and processing machine of the type disclosed in co-pending application Serial No. 185,167, filed April 4, 1962, now Patent No. 3,166,784, dated January 26, 1965, and in Patent No. 3,059,272, dated October 23, 1962.

It is a more specific object of the invention to provide a sausage link forming and conveying apparatus which includes an endless traveling conveyor which is adapted to receive a plurality of parallel lengths of stuffed sausage casings and associated mechanism for dividing the same into link forming sections and for carrying the links through processing chambers, which mechanism comprises linking bar assemblies on the conveyor each having a plurality of individual casing constricting and holding devices mounted so that they are readily removable and replaceable in the event an individual device is damaged or fails to function properly, thereby enabling the devices to be removed individually from the linking bars without any need for disassembly of the conveyor or removal therefrom of the linking bars.

It is a further object of the invention to provide in a sausage linking machine, a link supporting and carrying conveyor provided with a series of lonigtudinally spaced cross bars each of which has mounted thereon a plurality of casing constricting devices which devices are aligned longitudinally of the conveyor so as to enable multiple lines of casings to be divided into sausage forming links, the devices being removably mounted on the cross bars so that they may be readily replaced without removing or altering the cross bars and being effective when in operative position to constrict the casings at intervals and to hold the constricted casing sections against removal from the conveyor while the conveyor moves through a series of chambers for processing the sausages.

These and other objects and advantages of the invention will be apparent from a consideration of the apparatus which is shown by way of illustration in the accompanying drawings wherein:

FIGURE 1 is a side elevation of a portion of a sausage linking and conveying apparatus which embodies the principal features of the invention, the apparatus being shown in part diagrammatically;

FIGURE 2 is a transverse view taken generally on line 2—2 of FIGURE 1, to an enlarged scale, and with portions omitted, the view showing the sausage linking and carrying conveyor;

FIGURE 3 is a partial cross section taken generally on the line 3—3 of FIGURE 1, to a larger scale and with portions broken away, the view illustrating an end portion of one of the link forming bar assemblies and associated mechanism;

FIGURE 4 is a fragmentary elevational view to a larger scale showing an end portion of one of the cross bar assemblies;

FIGURE 5 is a fragmentary cross section taken generally on the line 5—5 of FIGURE 3, to an enlarged scale;

FIGURE 6 is a fragmentary cross section similar to FIGURE 5 with the link forming members in a different position;

FIGURE 7 is a fragmentary cross section taken on the line 7—7 of FIGURE 4, to an enlarged scale;

FIGURE 8 is a perspective view, to an enlarged scale, of one of the casing constricting devices removed from the supporting cross bar; and FIGURE 9 is a perspective view, to an enlarged scale, of one of the spring fasteners for securing the casing constricting devices in position on the supporting cross bar.

Referring to FIGURES 1 to 3 of the drawings, there is illustrated a portion of a continuously traveling endless chain conveyor 10 which forms the link receiving and supporting conveyor for an apparatus which is adapted to divide a plurality of length of stuffed sausage casings 11 into link forming sections 12 and thereafter advance the links through cooking, smoking and like processing chambers in a continuous operation. The conveyor 10 is suitable for use in the link forming and processing apparatus illustrated in co-pending application Serial No. 185,167, filed April 4, 1962, which may be referred to for details of the apparatus not hereinafter described.

The conveyor 10 has a horizontally disposed upper run at one end of the apparatus which is supported on an upright stand 13. The stand 13 also supports a frame 14 extending vertically above the upper run of the conveyor 10 on which there is mounted for reciprocation in a vertical plane a plurality of devices which co-operate with casing constricting and gathering devices on the conveyor 10 for dividing each of the plurality of lengths of stuffed sausage casings 11 which are fed thereto in parallel, laterally spaced relation, into a connected series of link forming sections 12, the latter being gripped on the conveyor 10 while they are carried through processing chambers or compartments by the conveyor.

The conveyor 10 on which the sausage links 12 are formed comprises a pair of endless chains 15 and 15′ (FIGURE 2) which are disposed in transversely spaced, parallel relation and carried on suitable sprockets spaced throughout the processing machine, two of the sprockets being indicated at 16 and 16′ in FIGURE 1. Chains 15 and 15′ are supported on guide rail members 17 and 17′ mounted on the sides of the supporting stand 13 at the linking station so that the upper run of the conveyor 10 travels in a generally horizontal path during the linking operation. A plurality of cross bar assemblies 18 extend between the chains 15 and 15′ and are spaced longitudinally of the conveyor with the spacing between the assemblies 18 corresponding to the length desired for the links 12. Each of the link forming cross bar assemblies 18 comprises a single plate-like support bar 20 (FIGURES 3 to 6) which is attached at its opposite ends to the chains 15 and 15′ by bracket forming angle members 21 and 21′ (FIGURE 2). The support bars 20 are mounted in transversely extending, parallel relation on the chains 15 and 15′ and are spaced longitudinally thereof according to the size desired for the links 12.

Each of the support bars 20 (FIGURES 4 to 7) is preferably formed of a metal plate of rectangular shape and each bar 20 has a series of upwardly opening, V-shaped slots 22 in its upper margin with the side edges 23 and 23' of each slot 22 converging downwardly and terminating at an opening 24 in the top edge of a circular pocket 25 in which a neck forming device 26 is adapted to be seated. The pocket 25 has a protuberance 27 projecting radially inwardly of the bottom side thereof and opposite the top opening.

The neck forming devices 26 are fabricated of a relatively tough, somewhat flexible material such as Teflon, nylon, or an acetate plastic, for example. Each neck forming device 26 comprises a generally cylindrical plate-like or button-like member having a diameter slightly less than the diameter of the pocket 25 and a thickness somewhat greater than the thickness of the support plate 20 so that side faces 28 and 28' project beyond the adjacent portions of the flat side faces of the plate 20 when the device 26 is seated in the pocket 25. The device 26 has a parallel, outwardly opening annular grooves 30 and 30' in its peripheral edge 31, the distance between the grooves 30 and 30' being approximately the same or slightly greater than the thickness of the support plate 20 and the grooves being adapted to receive spring fastener elements 32 and 32' (FIGURES 3 and 7) for securing the device 26 in operative position in the pocket 25 in the support plate 20. A radially extending slot or notch 33 is provided in the bottom margin for accommodating the protuberance 27 which holds the device against rotation in the pocket 25. At the side opposite the marginal slot or notch 33 the device 26 has a relatively small, inwardly extending V-shaped slot 34 with converging side edge forming portions 35 and 35' which extend to a radially extending slit 36, the latter providing an entrance to a small transverse neck receiving and holding aperture or pocket 37 of cylindrical shape and extending between the faces 28 and 28' of the device. As illustrated, the pocket 37 is concentric with the peripheral outline of the device. Each side face 28 and 28' is cut away adjacent the slit 36 and the leveled edges or surfaces 40 and 40' thus formed extend to the ends of the neck holding pocket 37.

The devices 26 are each held in a pocket 25 by two spring washer type fasteners 32 (FIGURES 4, 7 and 9). Each fastener is C-shaped with inward bulges 41 and 41' on the ends and when seated in the edge slots 30 and 30' by forcing the ends apart sufficiently to snap into place, outside portions of the ends overlie portions of the bar 20 adjacent the pocket 25 while the center portions 42 lie on opposite faces of the protuberance 27 (FIGURES 4 to 6), with the center portion 42 being exposed so that it may be engaged by a tool for forcing the fastener out of the groove in the device 26 when it is desired to remove the latter from the pocket 25.

In using the apparatus, the lengths of stuffed casing 11 are fed so that they are laid in the V-shaped slots 22 defined by the edges 23 and 23' in the cross bar assemblies 18 and the cross bar assemblies 18 are advanced by movement of the conveyor 10 to the linking station (FIGURE 1) where they are disposed beneath the vertically reciprocating cross bar 45 (FIGURE 3) on the frame 14. The cross bar 45 has a plurality of transversely spaced pairs of depending plates 46 which have downwardly opening V-shaped slots 47 in their lower ends. The slots 47 in each pair of plates 46 are aligned in the longitudinal direction of the conveyor 10 and each pair of plates 46 is positioned on the cross bar 45 to place the slots 47 in alignment with a slot 22 and the slot 34 in the associated necking device 26 as the latter is brought into vertical alignment or register beneath the cross bar 45 (FIGURE 5). The cross bar 45 is reciprocated vertically by a suitable mechanism (not shown) in timed relation to the movement of the cross bar assemblies on the conveyor 10 so as to move the neck forming plates 46 into straddling relation with the casing constricting devices 26 on each successive cross bar assembly 18. The bar 45 is moved downwardly a sufficient distance to force the stuffed casings 11 down through the slots 36 and into the pockets 37 where the constricted portions of the casings are held while the necking plates 46 are raised and the conveyor 10 advances the links beyond the linking station and through the processing chambers.

While particular materials and specific details of construction are referred to in describing the illustrated form of the apparatus, it will be understood that other materials and different structural details may be resorted to within the spirit of the invention.

I claim:

1. In a machine for linking stuffed sausage casing, a movable support having cross bar assemblies which are spaced apart a distance corresponding to the length of link desired, said cross bar assemblies each comprising a flat, generally rectangular support bar member having an upper edge with an upwardly opening, generally V-shaped slot defined by downwardly converging side edges which terminate at a side opening in a relatively small, generally circular pocket, a casing constricting device mounted in said pocket which constricting device is formed of rubber-like material and is characterized by a relatively small circular plate having a thickness somewhat greater than the thickness of the support bar, and having a diameter somewhat less than the diameter of said pocket, said device having a pair of parallel, spaced annular grooves in its peripheral edge, flat spring washers seated in said annular grooves for holding the device in said pocket, said device having a marginal slot and a protuberance on said support bar extending into the circular pocket and engaging in said marginal slot to prevent rotation of said device in said pocket, said device having a small V-shaped notch in its margin which is aligned with the inner end of the V-shaped slot in the support bar, said V-shaped notch terminating at a small cross slit which provides an expansible entrance to a neck receiving pocket of genreally cylindrical shape and small diameter and which is generally concentric with the exterior outline of said device.

2. In a machine for linking stuffed sausage casings, a traveling conveyor comprising laterally spaced chains and cross bar assemblies which are spaced apart a distance corresponding to the length of link desired, said cross bar assemblies each comprising a flat, generally rectangular bar member having an outer edge with outwardly opening, generally V-shaped slots each defined by inwardly converging side edges which terminate at an opening to a relatively small, generally circular pocket, casing constricting devices mounted in said pockets which constricting devices are formed of rubber-like material and are characterized by a relatively small circular plate having a thickness somewhat greater than the thickness of the support bar, said plate having a diameter somewhat less than the diameter of said pocket, said plate having a pair of parallel, spaced annular grooves in its peripheral edge, a pair of flat spring washers seated in said grooves for holding the device in its pocket, said plate having a marginal slot and a lug formation on said support bar extending into the pocket and engaging in said marginal slot to prevent rotation of said plate in said pocket, said plate having a small V-shaped notch in its margin which is aligned with the inner end of a V-shaped slot in the support bar, said V-shaped notch terminating at a small slit which provides an entrance to a neck receiving pocket of generally cylindrical shape and small diameter.

3. In a machine for linking stuffed sausage casings, a traveling conveyor having spaced side members and connecting cross bar assemblies which are spaced longitudinally of the conveyor a distance corresponding to the length of link desired, said cross bar assemblies each comprising a support bar member having an outermost edge with outwardly opening, generally V-shaped slots each defined by inwardly converging side edges which terminate at an opening into a relatively small circular pocket, a casing constricting device adapted to be mounted in a pocket which constricting device is formed of somewhat flexible and stretchable material and is characterized by a relatively small circular plate with a greater thickness than the thickness of the support bar, and having a diameter less than the diameter of said pocket, said plate having a pair of parallel, spaced annular grooves in its peripheral edge, C-shaped flat spring washers seated in said grooves for holding the plate in the pocket, said plate having a marginal slot and a protuberance on said support bar engaging in said marginal slot to prevent rotation of said device in said pocket, said device having a small outwardly opening V-shaped notch in its margin which is aligned with the inner end of the V-shaped slot in the support bar, said V-shaped notch extending to a small slit which provides an entrance to a neck receiving pocket of generally cylindrical shape and small diameter.

4. In a machine for linking stuffed sausage casings, a traveling conveyor having spaced side members and connecting cross bar assemblies which are spaced longitudinally of the conveyor a distance corresponding to the length of link desired, said cross bar assemblies each comprising a support bar member having an outermost edge with outwardly opening, generally V-shaped slots each defined by inwardly converging side edges which terminate at an opening into a relatively small circular pocket, a casing constricting device adapted to be mounted in the circular pocket which constricting device is fabricated of rubber-like material and is in the form of a relatively small circular plate with a greater thickness than the thickness of the support bar and a diameter slightly less than the diameter of the circular pocket, said plate having a pair of parallel, spaced annular grooves in a portion of its peripheral edge, C-shaped flat spring washers having portions seated in said annular grooves for holding the plate in the pocket, said device having a small outwardly opening, V-shaped notch in its margin which is aligned with the inner end of the V-shaped slot in the support bar, said V-shaped notch extending to a small slit which provides an entrance to a neck confining pocket of relatively small cross section.

5. In a machine for linking stuffed sausage casings, a movable support having cross bar assemblies which are spaced apart a distance corresponding to the length of link desired, said cross bar assemblies each comprising a plate-like generally rectangular support bar member having an outermost edge with an outwardly opening, generally V-shaped slot formed by downwardly converging side edges which terminate at spaced points defining a side opening forming an entrance to a relatively small, generally circular pocket, a casing constricting device adapted to be removably mounted in said pocket which constricting device is fabricated of rubber-like material and is in the form of a relatively small, generally circular plate having a greater thickness than the support bar and a diameter less than the diameter of said pocket so as to fit therein, said device having parallel, annular grooves in its peripheral edge which are spaced apart and flat spring washers seated in said annular grooves and engaging opposite faces of said support bar to hold the device in said pocket, said device having means co-operating with said support bar to prevent rotation of said device in said pocket, said device having a V-shaped notch in its margin which is defined by edges aligned with the inner ends of the edges defining the V-shaped slot in the support bar, said V-shaped notch terminating at a small slit which provides an expansible entrance to a neck retaining pocket of generally cylindrical shape and small diameter and in the center of said device.

References Cited by the Examiner

UNITED STATES PATENTS 3,042,963   7/1962   Runge _____ 17—34

OTHER REFERENCES

German printed application, Hochnetz 1,012,210, July 11, 1957.

SAMUEL KOREN, *Primary Examiner.*

LUCIE H. LAUDENSLAGER, *Examiner.*